US000001522H

United States Statutory Invention Registration [19]

[11] Reg. Number: H1522

Campillo et al.

[45] Published: Apr. 2, 1996

[54] LASER-MODULATED AEROSOL INFRARED DECOY

[75] Inventors: Anthony J. Campillo; Alan L. Huston; Brian L. Justus, all of Springfield, Va.; Thomas J. Manuccia, Silver Spring, Md.

[73] Assignee: Government of the United States, Washington, D.C.

[21] Appl. No.: 627,393

[22] Filed: Nov. 30, 1990

[51] Int. Cl.[6] ..... G02B 26/02

[52] U.S. Cl. ..... 239/8; 89/1.11; 107/367; 107/334; 252/305

*Primary Examiner*—Bernarr E. Gregory
*Attorney, Agent, or Firm*—Thomas E. McDonnell

[57] ABSTRACT

A system for protecting ships from attack by an infrared-seeking missile is provided which comprises decoying the missile by deploying an aerosol. In one embodiment, the aerosol merely scatters a modulated light beam. Another embodiment deploys particles that can undergo an exothermic photochemical reaction when initiated by an ultraviolet laser. The laser projects an image of the ship onto the aerosol and at the same time causes the particles to generate sufficient heat to attract the infrared-seeking missile away from the ship. This system presents an infrared-decoy target with a suitable infrared image of appropriate spatial scale to mislead a missile with imaging capability. The spectral content of the decoy's image resembles that of a blackbody 20°–50 ° C. above ambient, and has a brightness and spatial extent equal to the largest ships, approximately 10 kw/steradian, in the 3–5 and 8–12 micrometer bands. The present invention is simple to use, rapidly deployed, and capable of presenting a decoy target that can last at least a minute or more.

12 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LASER-MODULATED AEROSOL INFRARED DECOY

FIELD OF THE INVENTION

The invention relates to a method and apparatus for defeating an attack by an infrared-seeking missile, and in particular to a system wherein an aerosol of particles that undergo a photochemical reaction is illuminated with a laser image. The laser illumination initiates the photochemical reaction to produce heat that decoys the infrared-seeking missile away from the target.

BACKGROUND OF THE INVENTION

An important problem currently facing the Navy is the protection of their ships from missile attack. At present, surface ships are vulnerable to infrared seeking missiles which home-in on a large, bright infrared source such as a ship. It is desirable that these ships be able to defeat a missile attack by means such as decoying an approaching missile so that it misses its target.

A simple defensive technique against infrared seeking missiles is to deploy a screening cloud of dust or smoke to obscure the ship. However, smoke screens take a long time to deploy, and thus their use requires a relatively early warning. Smoke screens also require a large quantity of aerosol material. Screening clouds have the further disadvantage of blinding the ship as well as the attacking missile.

Rapidly deployable infrared decoys would make target acquisition more difficult for the infrared seeking missile. There are essential requirements that infrared decoys must fulfill in order to be effective. First, they must be as bright as the largest ships are in the wavelengths detected by the missile (approximately 10 kw/steradian)—existing missile infrared detectors measure the 3 to 5 μm and 8 to 12 μm bands. The decoys must be rapidly deployable to allow their use only when an incoming missile is detected. The decoy must produce its bright output for at least one minute so as to attract an infrared-seeking missile during its approach. Additionally, the decoy's infrared image must have a spectral content that resembles a blackbody with a temperature of about 20° to 50° C. above ambient temperatures. Ideally the decoy will also present its infrared image on an appropriate spatial scale so as to mislead not only present but also anticipated future advanced sensing systems. No existing decoy system possesses all of these features.

Currently, the Navy deploys flares to distract infrared-seeking missiles, but flares have several problems. Although flares are very bright, they emit a spectrum characteristic of a very hot blackbody (greater than 1,000° C.) rather than a blackbody of about 20° to 50° C. above ambient temperatures. That is, unlike a blackbody with a relatively equal energy output across its spectrum, the majority of the flare's energy is output at wavelengths in a narrow band.

Sensors monitoring the relative intensities at several wavelengths can immediately recognize and disregard such a flare. While the infrared wavelengths put out by flares can be modified by altering their chemistry, it appears to be very difficult to make the flare look like a cooler blackbody over its complete spectrum. Another problem associated with flares is that their output is usually too spatially localized to appear ship-like. It remains likely that heat seeking missiles will be able to distinguish between decoy flares and ships.

Another approach being developed is to deploy an aerosol of particles that undergo chemical reaction or phase changes upon deployment. The reaction causes the aerosol to release heat for a short period of time. This approach has not been successful because the particles burn and cool down too quickly (in less than 10 seconds).

There have been attempts to use chemical or aerosol screens in order to decoy an infrared-seeking missile target or to attenuate infrared signals or laser light. For example, a camouflaging aerosol that can cause a false target effect within the infrared range is disclosed in U.S. Pat. No. 4,406,815 (Magnusson et al). Pyrotechnic devices in compositions for producing an infrared blocking screen are disclosed in U.S. Pat. Nos. 4,728,375 (Simpson), 4,719,856 (Joslin), and 4,719,857 (Spring). Finally, systems for attenuating or dissipating laser light energy are disclosed in U.S. Pat. Nos. 4,673,250 (Roberts et al), and 3,992,628 (Karney). However, none of these systems can effectively and reliably decoy incoming infrared-seeking missiles.

It is an object of this invention to decoy an infrared seeking missile with an aerosol.

It is a another object to have the aerosol have an infrared emission spectrum similar to a large blackbody 20° to 50° C. above ambient temperature.

It is another object of this invention to have the infrared emission from the aerosol continue for several minutes.

It is a further object of this invention to be able to control the spatial dispersion of infrared emissions from the aerosol.

SUMMARY OF THE INVENTION

These and other objects are provided by a method and apparatus that creates an alternate infrared target comprised of an aerosol of particles capable of undergoing a photochemical reaction to produce heat. A high powered light initiates the reaction by projecting upon the aerosol a life-size image. The light induced reaction releases heat that creates a life-size image with an appropriate blackbody temperature and brightness. The heated aerosol becomes a decoy target which mimics the size and the infrared signature of a target.

In another embodiment, lasers with different wavelength light illuminate a non-reactive aerosol. By adjusting the ratio between the intensities of the different illuminating wavelengths, the aerosol can be made to look like a blackbody to the missile's infrared detector system.

BRIEF DESCRIPTION OF THE DRAWING FIGURE

DETAILED DESCRIPTION OF THE PREFERRED EMBODIMENTS

Figure 1:
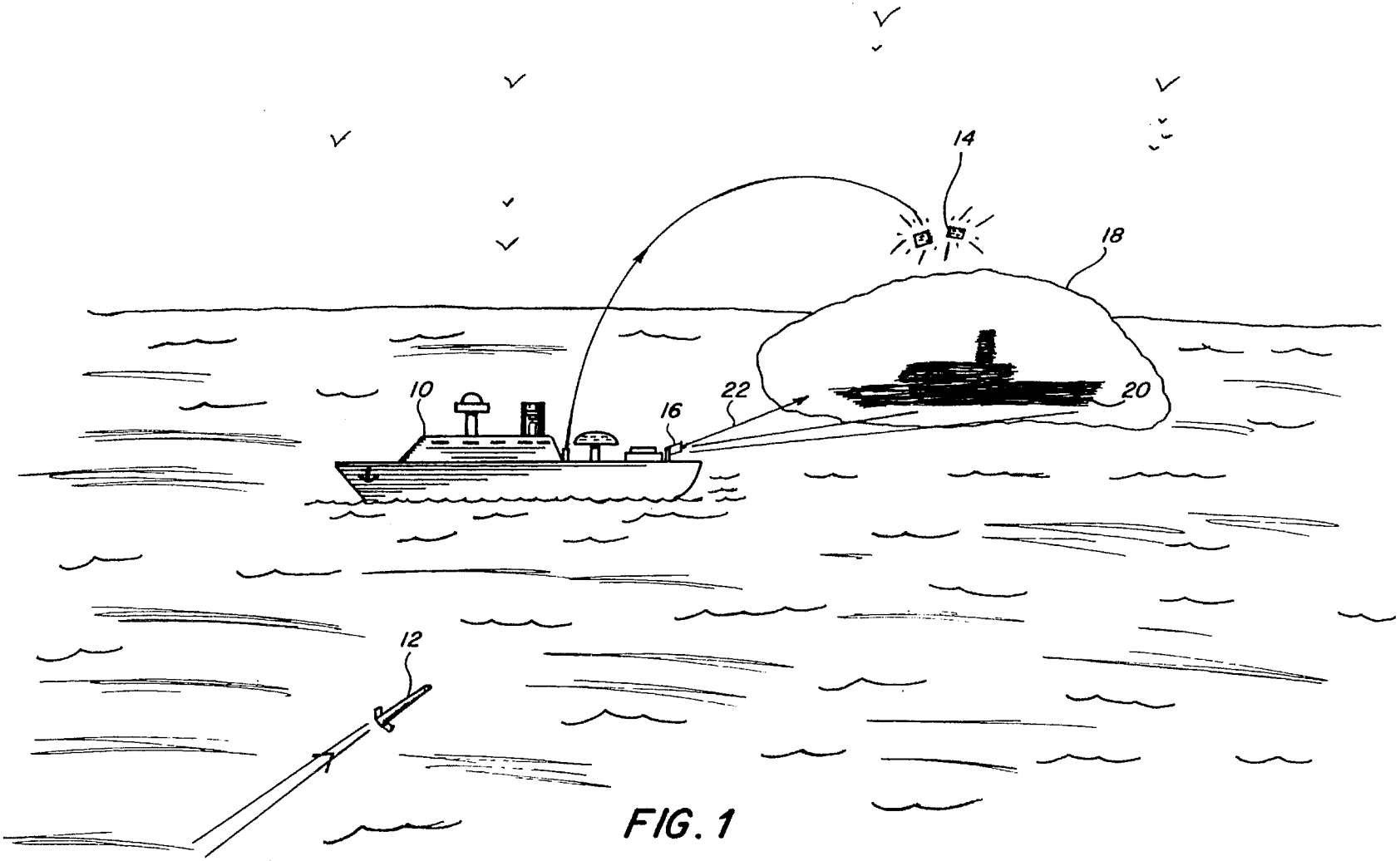
FIG. 1 is a schematic representation of the present invention.

FIG. 1 shows a schematic representation of an embodiment of the present invention. A ship at sea 10 can avoid a direct hit from an infrared seeking missile 12 by deploying an exploding canister 14. Canister 14 disperses an aerosol 18. Dispersed aerosol 18 is illuminated by light source 16 which projects beam 22 to create a life-sized image 20 of the ship.

To achieve the infrared brightness necessary to effectively decoy an infrared seeking missile, several megawatts of continuous energy must be projected by the aerosol for a minute or more. Because most lasers cannot supply the necessary level of energy, the required energy is preferably provided by the chemical energy stored in an aerosol. This chemical energy is controllably released when the particles are selectively illuminated. The level of reaction initiated, and thus the amount of heat released, will be proportional to the brightness of light source 16: the photochemical reaction amplifies the energy in light beam 22. Even with high powered light sources, the ratio of chemical energy to light energy typically must be greater than 100. Preferably, the ratio will approach about 10,000.

Illumination by beam 22 initiates a photochemical reaction which amplifies the energy in image 20 to decoy infrared-seeking missile 12. The two most crucial elements in this system are: the photochemical particles which make up aerosol 10; and light source 16, most desirably a laser, which projects an intense image onto aerosol 10 to initiate the photochemical reaction.

A laser is preferred for light source 16 because it can be selected to deliver an intense light at the wavelength which most efficiently initiates the selected photochemical reaction. However, any light source capable of generating a sufficiently intense image at the proper wavelength is suitable. Preferably, the image is painted on the aerosol by a conventional projection-scanning system such as those found in popular "laser-color" shows. Because all the light energy is concentrated on a small area of the aerosol, a lower power light source 16 is acceptable.

A light initiated slow photochemical reaction, such as an auto-oxidation, free radical, polymerization, or other reaction, can release enough heat to create an infrared source. Ideally, the heat would be released in proportion to the incoming UV illumination provided by the laser. An example of the free radical reaction is:

$$A + h\nu_{uv} \rightarrow A^* \text{ (free radical)}$$

$$A^* + RB \rightarrow A^* + R + B + \text{heat}$$

$$A^* + RB \rightarrow A^* + R + B + \text{heat}$$

(repeated many times)

Thus, in this embodiment, the primary function of aerosol 18 is not to merely providing a "screen" on which a decoy image 20 can be projected. Rather, the aerosol provides a spatially dispersed source of chemical energy which can be used to develop an infrared, decoy image.

There are many suitable photochemical reactions that will provide the energy amplification required to make the aerosol a suitable infrared decoy target. One such suitable reaction is the auto-oxidation reaction of liquid benzaldehyde, as discussed in "The Chemistry of Free Radicals", W. A. Waters, Oxford, 1948, page 237. Light accelerates the conversion of benzaldehyde to benzoic acid on exposure to air. Studies have shown that this reaction occurs via a chain reaction where one quantum of light may bring about the oxidation of up to 10,000 molecules of benzaldehyde. In bulk solution and in the presence of ultraviolet radiation, this reaction typically displays a ratio of blackbody light from the aerosol to illuminating UV light of about $10^4$.

Because this reaction is strongly exothermic (approx. 20 kcal/mole), the reaction is expected to provide this invention with an energy ratio of 1,000. Thus, if 100 kg of 400 micrometer diameter liquid droplets were illuminated by a 1 kw UV laser, upwards of 1 MW of chemical energy will be released. Of this amount, approximately 70% will be lost due to thermal conduction to the surrounding air.

The lost heat is insufficient to raise the air temperature to the desired 20° to 50° C. above ambient temperature. Even if the air did become hot enough, air does not have the right emissivity to act as an infrared source. Thus, it is the remaining 30% of the energy—which raises the temperature of the aerosol particles by about 50° C.—that causes an increase of approximately 10 kw/steradian in the blackbody brightness in the 8–12 μm band.

Any aerosol with a sufficiently exothermic reaction, responsive to a controlled illumination can also be employed in this embodiment. About 200 to 500 kg of liquid benzaldehyde would be a suitable quantity of reactant for this embodiment. Alternative aerosols with more exothermic reactions could significantly reduce the weight and volume of reactant required. Iron is an example of a more exothermic, alternative reactant.

Figure 2:
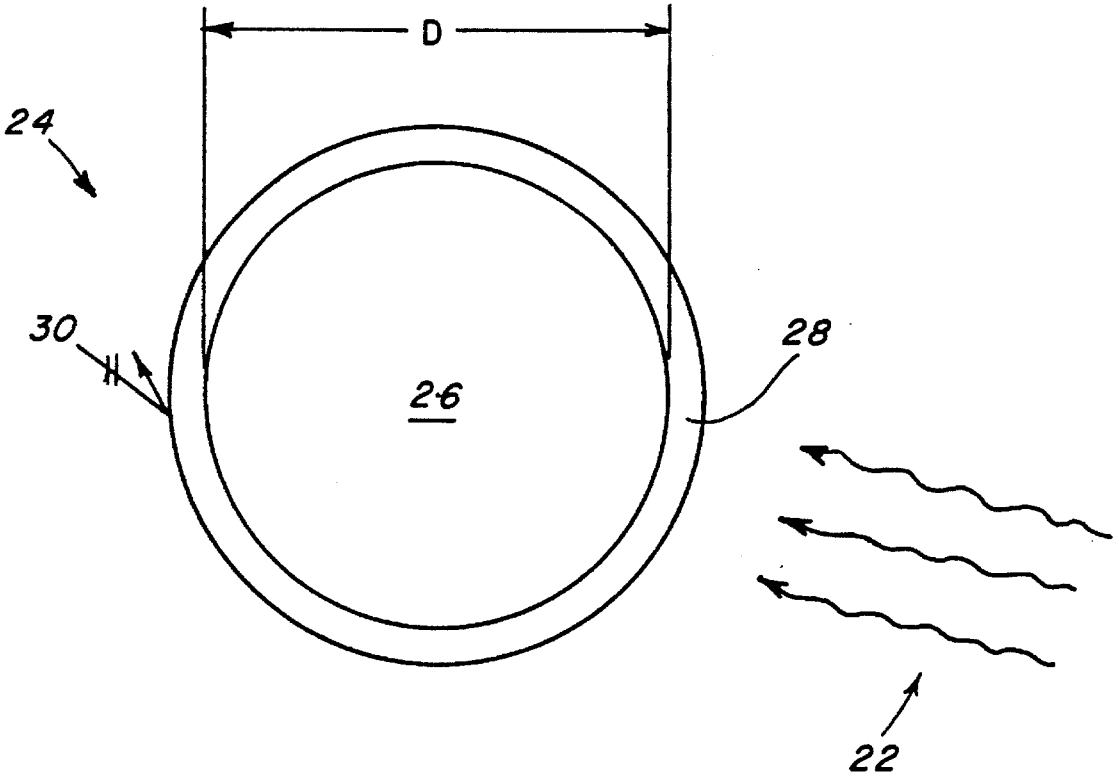
FIG. 2 is a schematic representation of an individual particle from the aerosol of an alternative embodiment.

FIG. 2 shows an individual particle 24 from the aerosol of an alternative embodiment. Core 26 comprises a material capable of an exothermic, oxidation reaction; this small particle would instantaneously oxidize if it were exposed to air. Layer 28 is relatively impermeable to oxygen: atmospheric oxygen 30 cannot reach the particle's reactant core 26. Light 22 photochemically alters layer 28 and increases its oxygen permeability allowing oxygen 30 to reach reactant 26 and initiate oxidation. However, even in its altered state, layer 28 limits the rate at which oxygen can reach the reactant core 26: the limited oxygen availability creates a low temperature oxidation reaction that can continue for more than a minute. When an aerosol 18 of particles 24 is illuminated by the spatially or temporally modulated high intensity light 22, the light photochemically modulates the oxygen permeability of layer 28. Therefore, light 22 photomodulates the infrared intensity of decoy aerosol 18.

As an example of this embodiment, consider the oxidation of iron particles. The iron core 26 is initially isolated from atmospheric oxygen 30 by an impermeable plastic layer 28. Upon exposure to ultraviolet light, plastic layer 28 undergoes a photochemical change that increases its oxygen permeability. In the new, high permeability state, layer 28 passes enough oxygen to heat the particles to 20° to 50° C. above the ambient temperature. If the diameter D of particles 24 is large enough—about 100 μm—the particle will generate heat for several minutes. However, the size and density of the particle must also assure that the aerosol does not settle too quickly. Otherwise, the aerosol will not be present during an attacking missile's final approach.

Iron is a desirable reactant for the core because, as it reacts with air, it does not form an effective passivating layer that prevents further oxidation of the remaining iron. More energetic metals (such as aluminum) have the difficulty that a surface oxide coating rapidly forms that prevents further reaction at ambient temperatures. These metals can be used if made up of a cluster of small spheres where each sphere has a radius less than the thickness of that metal's passivating layer. These small spheres will be attracted to each other by Van Der Waals forces; clusters of these spheres can then be coated by impermeable layer 28. Thus, the invention can use high efficiency metals such as boron, calcium, aluminum, and silicon.

For example, if layer 28 is made from polyethylene it only passes enough oxygen to raise the temperature of the particle by about 1° C. Short wavelength ultraviolet light—such as 250 nm—can be used to controllably degrade the polyethylene's permeability. The cross-linking of polymers following ultraviolet excitation will lead to more than an order of magnitude increase in the oxygen permeability of layer 28. Because the atmosphere filters out short wavelength ultraviolet, normal daylight does not have significant amounts of 250 nm light. Control light 22 will not be swamped by daylight.

Another alternative embodiment uses infrared lasers 16 to paint a 2 or 3-wavelength infrared image on an aerosol 18 whose particles scatter the laser light. In this scheme no photochemical heating of aerosol 18 needs to occur; rather, the approach is similar to a conventional movie projector where the screen is aerosol 18.

Assuming that aerosol 18 isotropically scatters light in all directions, approximately 60 kw of laser power would be required in each band to achieve a 5 kw/steradian brightness. However, highly anisotropic scattering can occur from particles whose dimensions are similar to that of the wavelength of light to be scattered. By choosing particles of the proper size, the back-scattered light can be made much more intense than that at other angles; this would reduce the power requirements to perhaps only 1 kw/laser.

This projection approach will take advantage of the relatively unsophisticated nature of existing infrared-seeking missiles spectral testing. Some of these missiles detect all wavelengths of infrared light; other missiles discriminate against hot flares by a two wavelength test (for example, determining the ratio of a 3–5 micron light versus 8–12 micron light). In principle, because of infrared sensitivity limitations and the presence of only a few infrared atmospheric windows, it will be difficult for infrared seekers to use sophisticated spectral filtering. Therefore, by using two infrared lasers of appropriate wavelengths (for example, at about 3.8 μm and about 10.6 μm) and elastically scattering their infrared light off an aerosol, an infrared image can be displayed to attract an infrared-seeking missile.

The image produced in accordance with the present invention will faithfully mimic that of a ship and thus will distract sensors employing sensing means other than infrared. Other sensors would include various imaging schemes or spectral filters. The embodiments of the present invention can thus be used to protect ships against present and future infrared-seeking missiles.

What is claimed is:

1. A method of decoying infrared sensors, said method comprising the steps of:

a) deploying an aerosol of particles capable of undergoing an exothermic reaction responsive to illumination by an appropriate wavelength of light;

b) modulating a beam of light at said wavelength with a preselected image; and c) illuminating said aerosol with said beam of light.

2. The method of decoying infrared sensors of claim 1, wherein said deploying is accomplished by an exploding canister.

3. The method of decoying infrared sensors of claim 1, wherein said exothermic reaction is photochemical.

4. The method of decoying infrared sensors of claim 3, wherein said particles are comprised of benzaldehyde.

5. The method of decoying infrared sensors of claim 1, wherein said exothermic reaction is oxidation.

6. The method of decoying infrared sensors of claim 5, wherein said particles are comprised of a metal.

7. The method of decoying infrared sensors of claim 6, wherein said metal is coated with a compound whose permeability to oxygen increases on exposure to said wavelength of light.

8. The method of decoying infrared sensors of claim 1, wherein said beam of light is projected by a laser.

9. The method of decoying infrared sensors of claim 1, wherein said wavelength of light is an ultra-violet light.

10. A method of decoying infrared sensors, said method comprising the steps of:

a) deploying an aerosol capable of scattering infrared light;

b) modulating a light beam composed of multiple wavelengths of light with a preselected image; and c) illuminating said aerosol with said light beam.

11. An apparatus for decoying infrared sensors, said apparatus comprising:

a) means for deploying an aerosol capable of undergoing an exothermic reaction responsive to illumination by an appropriate wavelength of light;

b) means for modulating a beam of light at said wavelength with a preselected image; and c) means for illuminating said aerosol with said beam of light.

12. The apparatus for decoying infrared sensors of claim 11, wherein the means for illuminating comprises a laser.

* * * * *